US008657326B2

(12) United States Patent
Shaanan et al.

(10) Patent No.: US 8,657,326 B2
(45) Date of Patent: Feb. 25, 2014

(54) STROLLER WITH CONVERTIBLE CHILD-SUPPORT SYSTEM

(75) Inventors: Gad J. Shaanan, La Jolla, CA (US); Bruce K. Busby, San Diego, CA (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 13/456,995

(22) Filed: Apr. 26, 2012

(65) Prior Publication Data

US 2012/0274050 A1    Nov. 1, 2012

Related U.S. Application Data

(60) Provisional application No. 61/479,216, filed on Apr. 26, 2011.

(51) Int. Cl.
*B62B 7/12* (2006.01)

(52) U.S. Cl.
USPC ........... 280/644; 280/643; 280/658; 280/642; 280/47.38; 297/354.12; 297/118; 5/655

(58) Field of Classification Search
USPC ........ 280/642–644, 648, 657, 658, 31, 47.34, 280/47.38, 47.41; 297/16.1–16.3, 19, 118, 297/284.1, 354.12, 354.13, 378.1, 378.14, 297/382; 5/98.1, 98.3, 99.1, 655
See application file for complete search history.

(56) References Cited

U.S. PATENT DOCUMENTS

| | | | |
|---|---|---|---|
| 3,330,575 A | 7/1967 | Boudreau | |
| 3,402,939 A * | 9/1968 | De Falco | 280/47.38 |
| 4,366,587 A * | 1/1983 | Takada | 5/94 |
| 4,438,941 A | 3/1984 | Guillaume | |
| 4,836,573 A * | 6/1989 | Gebhard | 280/644 |
| 5,115,523 A * | 5/1992 | Cone | 5/94 |
| 5,201,535 A | 4/1993 | Kato et al. | |
| 5,375,869 A | 12/1994 | Hsiao | |
| 5,393,122 A * | 2/1995 | Andrisin, III | 297/354.13 |
| 5,590,896 A * | 1/1997 | Eichhorn | 280/642 |
| 5,660,435 A * | 8/1997 | Eichhorn | 297/219.12 |
| 5,662,380 A * | 9/1997 | Tam et al. | 297/354.12 |
| 5,772,235 A | 6/1998 | Espenshade | |
| 5,934,757 A * | 8/1999 | Smith | 297/452.13 |
| 6,036,263 A * | 3/2000 | Gold | 297/219.12 |
| 6,120,041 A * | 9/2000 | Gehr et al. | 280/30 |
| 6,557,871 B2 * | 5/2003 | Hsia | 280/47.38 |
| 6,594,840 B2 * | 7/2003 | Tomas et al. | 5/655 |
| 7,377,537 B2 * | 5/2008 | Li | 280/650 |
| 7,455,353 B2 * | 11/2008 | Favorito (nee Wilkins) et al. | 297/16.1 |
| 7,938,435 B2 | 5/2011 | Sousa et al. | |
| 2007/0096435 A1* | 5/2007 | Gilbertson et al. | 280/642 |
| 2009/0243261 A1* | 10/2009 | Sousa et al. | 280/658 |
| 2010/0201104 A1* | 8/2010 | Jacobs et al. | 280/650 |
| 2010/0229301 A1* | 9/2010 | Arnold et al. | 5/93.2 |

* cited by examiner

*Primary Examiner* — J. Allen Shriver, II
*Assistant Examiner* — Steve Clemmons
(74) *Attorney, Agent, or Firm* — Barnes & Thornburg LLP (57) ABSTRACT

A child carrier in accordance with the present disclosure is adapted to be mounted on a rolling stroller frame to hold a child for transport on the rolling stroller frame. In one mode, the child carrier is configured to provide a bassinet. In another mode, the child carrier is configured to provide a seat.

27 Claims, 8 Drawing Sheets

STROLLER WITH CONVERTIBLE CHILD-SUPPORT SYSTEM

PRIORITY CLAIM

This application claims priority under 35 U.S.C. §119(e) to U.S. Provisional Application Ser. No. 61/479,216, filed Apr. 26, 2011, which is expressly incorporated by reference herein.

BACKGROUND

The present disclosure relates to child carriers, and particularly to a juvenile stroller including a child carrier. More particularly, the present disclosure relates to a child carrier that is convertible to function as a bassinet or a seat at the option of a caregiver.

SUMMARY

A child carrier in accordance with the present disclosure is adapted to be mounted on a rolling stroller frame to hold a child for transport on the rolling stroller frame. In one mode, the child carrier is configured to provide a bassinet. In another mode, the child carrier is configured to provide a seat.

In illustrative embodiments, the child carrier includes a basket for holding a child and a basket-support frame adapted to be mounted on the rolling stroller frame. The basket includes a shape-changeable bottom panel and a surrounding side barrier. The side barrier is coupled to a perimeter portion of the shape-changeable bottom panel to form an interior child-receiving region sized to receive a child carried in the child carrier. The side barrier is made of a pliable, foldable material and therefore is deformed without damage each time the shape of the shape-changeable bottom panel is changed by a caregiver to establish either the bassinet mode or the seat mode of the child carrier.

In illustrative embodiments, the shape-changeable bottom panel includes a foot-end portion that can be moved relative to the side barrier from a substantially flat lowered position associated with the bassinet mode of the child carrier to a folded raised position associated with the seat mode of the child carrier. The shape-changeable bottom panel also includes an opposing head-end portion that can be moved relative to the side barrier and to the foot-end portion of the bottom panel from a substantially flat lowered position associated with the bassinet mode of the child carrier to an inclined raised position associated with the seat mode of the child carrier. In illustrative embodiments, the side barrier is generally expanded and taut when the bottom panel is placed in a bassinet mode and is generally collapsed and folded when the bottom panel is placed in the seat mode.

In illustrative embodiments, side wall of side barrier includes a side wall having a bottom edge coupled to a perimeter portion of the shape-changeable bottom panel, a top rim coupled to a top edge of the side wall, and a web coupled to the top rim and arranged to extend into an interior region bounded by the side wall and toward the shape-changeable bottom panel. The web includes a U-shaped foot-end inner edge that is separated from the side wall and arranged to extend generally around the foot-end portion of the shape-changeable bottom panel. The web also includes a U-shaped head-end inner edge that is separated from the side wall and arranged to extend generally around the head-end portion of the shape-changeable bottom panel.

In illustrative embodiments, the child carrier includes bottom panel shape-changer means for reconfiguring the shape of the side barrier to change between an expanded shape (associated with the bassinet mode of the child carrier) and a collapsed shape (associated with the seat mode of the child carrier) at the option of the caregiver to cause a shape change of the shape-changeable bottom panel that is coupled to a lower edge of the side wall. When the child carrier is in bassinet mode, the bottom panel takes on a bassinet-mode shape in which the foot-end and head-end portions of the shape-changeable bottom panel assume the substantially flat lowered positions when the side barrier is configured to assume the expanded shape. When the child carrier is in seat mode, the bottom panel takes on a seat-mode shape in which the foot-end portion assumes the folded raised shape and head-end portion assumes the inclined raised shape when the side barrier is configured to assume the collapsed shape.

In illustrative embodiments, the bottom-panel shape-changer means comprises a foot-end zipper and a separate head-end zipper. The foot-end zipper is coupled to the U-shaped foot-end inner edge of the web and to a lower portion of the side wall bordering the foot-end portion of the shape-changeable bottom panel. The head-end zipper is coupled to the U-shaped head-end inner edge of the web and to a lower portion of the side wall bordering the head-end portion of the shape-changeable bottom panel.

The foot-end zipper includes a sliding piece that can be moved by a caregiver in one direction along an inner zipper track coupled to the lower portion of the side wall bordering the foot-end portion of the bottom panel and a companion outer zipper track coupled to the U-shaped foot-end inner edge of the web to configure a foot-end portion of the side wall of the side barrier to assume the collapsed shape to raise automatically the foot-end portion of the bottom panel upwardly from the substantially flat lowered position associated with the bassinet mode to the folded raised position associated with the seat mode. The foot-end zipper can be moved by the caregiver in the opposite direction to reconfigure a foot-end portion of the side barrier to assume the expanded shape to return automatically the foot-end portion of the bottom panel to the substantially flat lowered position associated with the bassinet mode.

The head-end zipper includes a sliding piece that can be moved by the caregiver in one direction along an inner zipper track coupled to the lower portion of the side wall bordering the head-end portion of the bottom panel and a companion outer zipper track coupled to the U-shaped head-end edge of the web to configure a head-end portion of the side wall of the side barrier to assume the collapsed shape to raise automatically the head-end portion of the bottom panel upwardly from the substantially flat lowered position associated with the bassinet mode to the inclined raised position associated with the seat mode. The head-end zipper can be moved by the caregiver along the zipper tracks in the opposite direction to reconfigure a head-end portion of the side barrier to assume the expanded shape to return automatically the head-end portion of the bottom panel to the substantially flat lowered position associated with the bassinet model Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a diagrammatic view suggesting that a convertible child carrier in accordance with the present disclosure can be configured (as shown in the upper left part of the drawing) to function as a bassinet that can be mounted in a stroller frame and, at the option of a caregiver, can be converted to function as a seat (as shown in the upper right part of the drawing) that can be mounted in the same stroller frame after the configuration of the stroller frame has been changed from bassinet mode to seat mode and suggesting that such conversion can take place after the caregiver (1) operates a foot-end zipper to change the shape of a foot-end portion of a side barrier included in the child carrier and to cause an automatic change in the shape of a foot-end portion of a bottom panel coupled to the side barrier and included in the child carrier as shown, for example, in FIGS. 5A-5D and (2) operates a head-end zipper to change the shape of a head-end portion of the side barrier to cause an automatic change in the shape of a head-end portion of a bottom panel coupled to the side barrier and included in the child carrier as shown, for example, in FIGS. 6A-6D;

FIG. 2 is an exploded perspective and diagrammatic assembly view of components included in the convertible child carrier of FIG. 1 showing (from bottom to top) a basket-support frame adapted to be mounted on a rolling stroller frame as suggested in FIG. 1 and seven components that can be assembled to create a basket adapted to be mounted on the basket-support frame, the basket components including a shape-changeable bottom panel having a foot end on the right and a head end on the left, and a multi-piece side barrier lying above the shape-changeable bottom panel and comprising an endless band made of fabric and including a top rim and a side wall coupled to the top rim and arranged to extend downwardly toward the shape-changeable bottom panel, a first screen adapted to be mounted on a near side panel included in the side wall, a second screen adapted to be mounted on a far side panel included in the side wall, a zipper-track carrier web adapted to be mounted on the endless band in a position shown, for example, in FIG. 5A, a U-shaped foot-end zipper (on the right), and a U-shaped head-end zipper (on the left);

DETAILED DESCRIPTION

Figure 1:
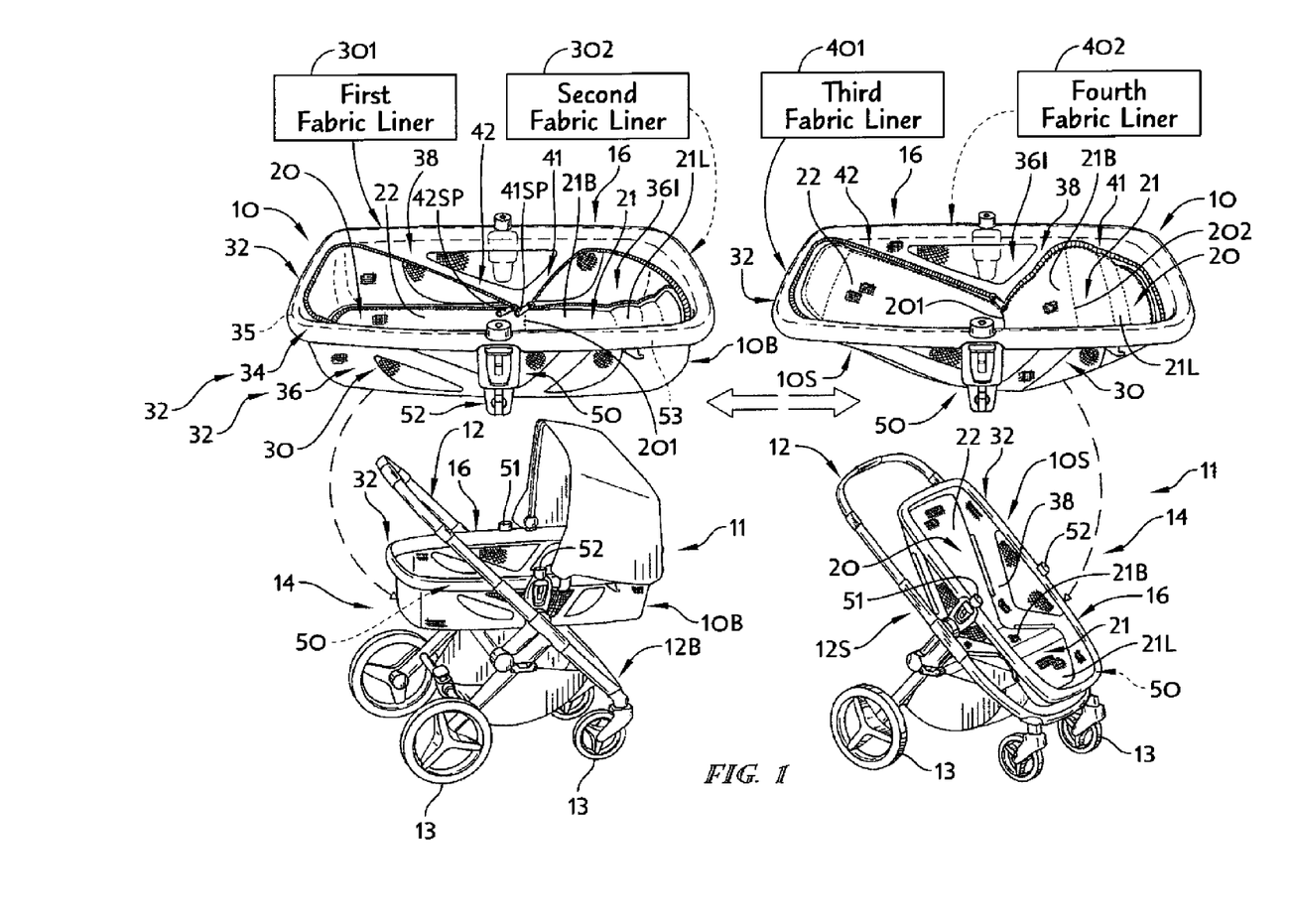

A child carrier 10 is configured to hold an infant child and to be coupled to a rolling stroller frame 12 to provide a juvenile stroller 14 as suggested in FIG. 1. The components included in child carrier 10 can be arranged in the field by a caregiver in one way to establish a bassinet mode 10B for child carrier 10 as suggested on the left side of FIG. 1. Those same components can be arranged in the field by the caregiver in another way to convert child carrier 10 to seat mode 10S as suggested on the right side of FIG. 1.

In an illustrative embodiment, child carrier 10 can be converted from bassinet mode 10B to seat mode 10S simply by (1) moving a sliding piece 41SP in a foot-end zipper 41 included in child carrier 10 as suggested in FIGS. 5A-5D and (2) moving a sliding piece 42SP included in a head-end zipper 42 included in child carrier 10 as suggested in FIGS. 6A-D. In an illustrative embodiment, the caregiver can configure rolling stroller frame 12 to assume a bassinet mode 12B as shown on the left side of FIG. 1 to mate with bassinet-mode child carrier 10B and can reconfigure rolling stroller frame 12 to assume a seat mode 12S as shown on the right side of FIG. 1 to mate with seat-mode child carrier 10S.

Child carrier 10 includes a basket 16 and a basket-support frame 50 as suggested in FIGS. 1-4. Basket 16 is mounted on basket-support frame 50 as suggested in FIGS. 1 and 2. Basket-support frame 50 can be mounted on rolling stroller frame 12 to support the child-carrying basket 16 for transport on rolling stroller frame 12 as suggested in FIG. 1.

Figure 2:
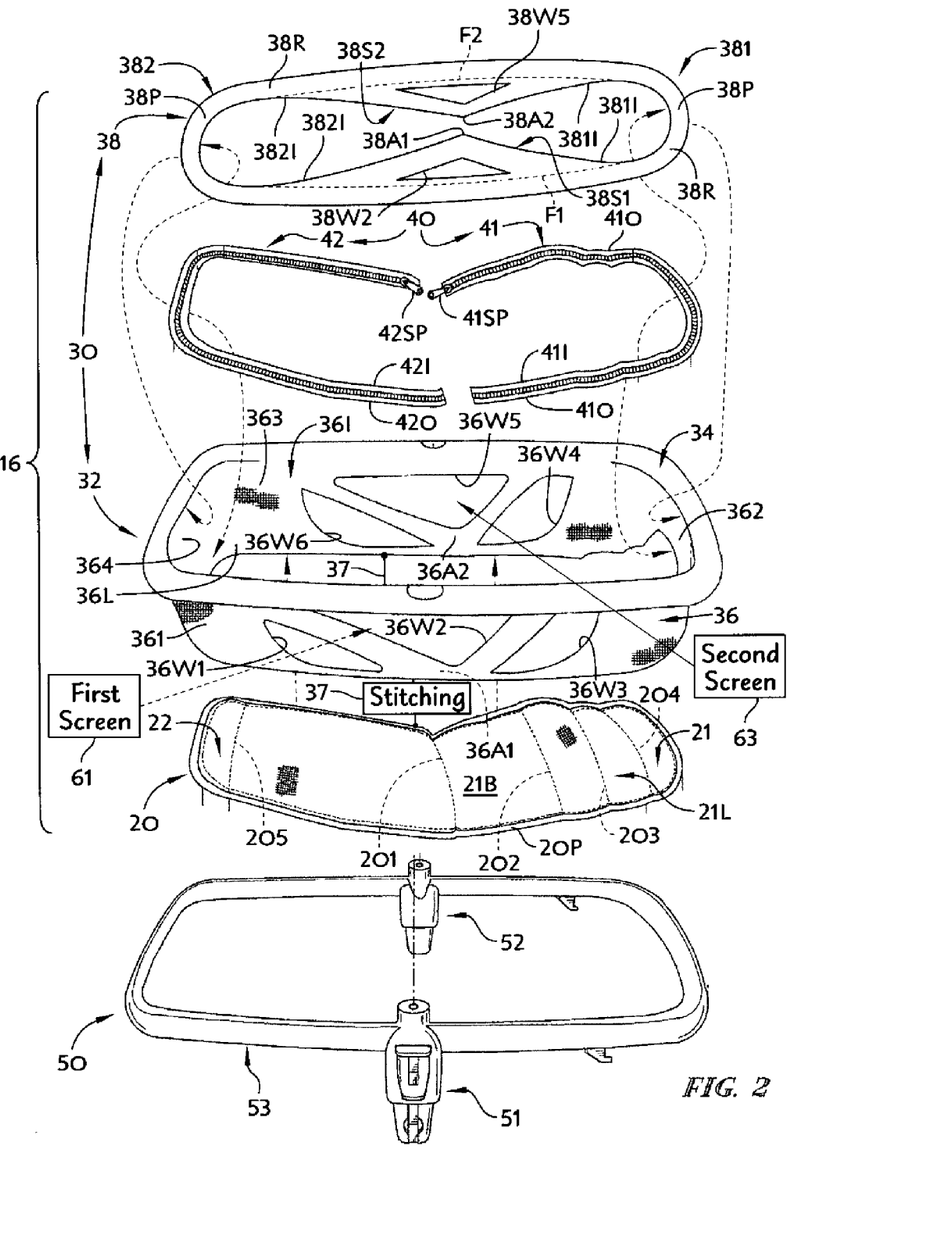
Figure 6A:
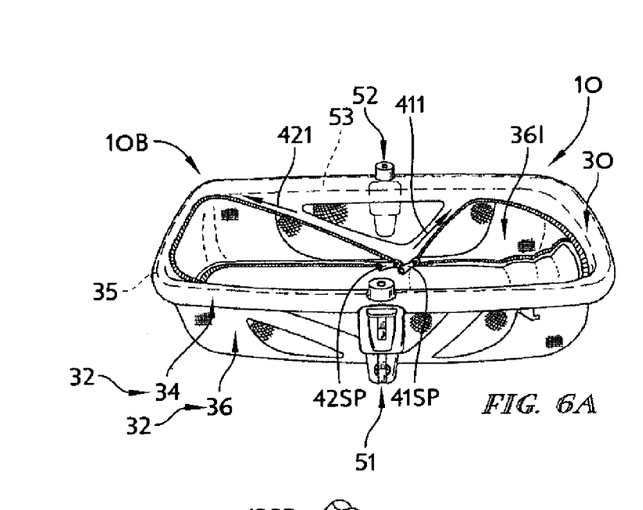
FIGS. 6A-6D show an illustrative sequence in which a caregiver operates an illustrative head-end zipper by sliding a head-end sliding piece along companion inside and outside head-end zipper tracks mounted on a head-end portion of the side barrier to reconfigure the head-end portion of the side barrier and to raise automatically the head-end portion of the bottom panel upwardly away from a substantially flat lowered position associated with the bassinet mode of the child carrier to assume an inclined raised position associated with the seat mode of the child carrier.
Figure 6B:
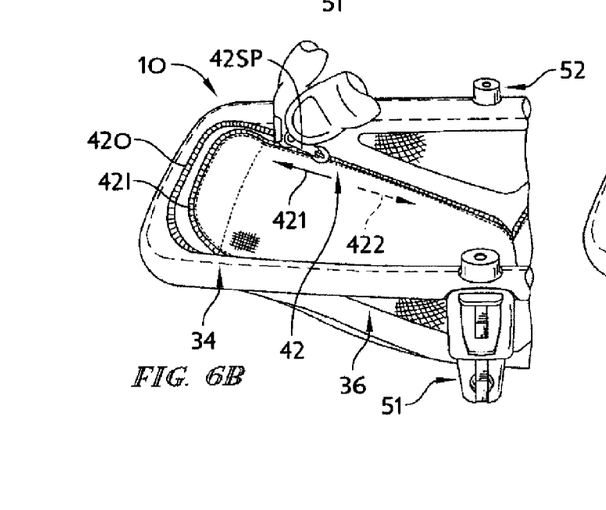
Figure 6C:
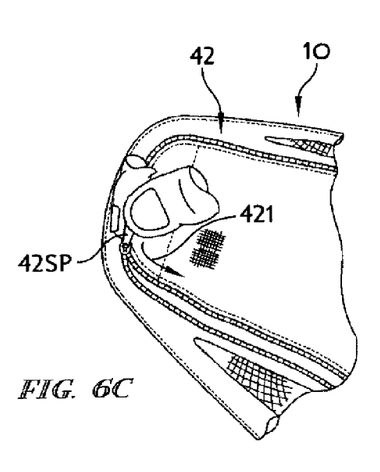
Figure 6D:
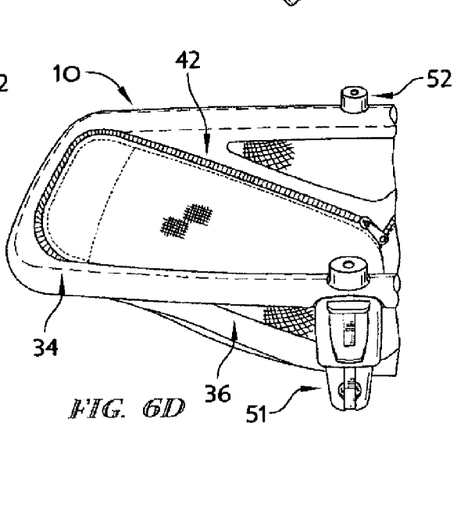
Figure 7A:
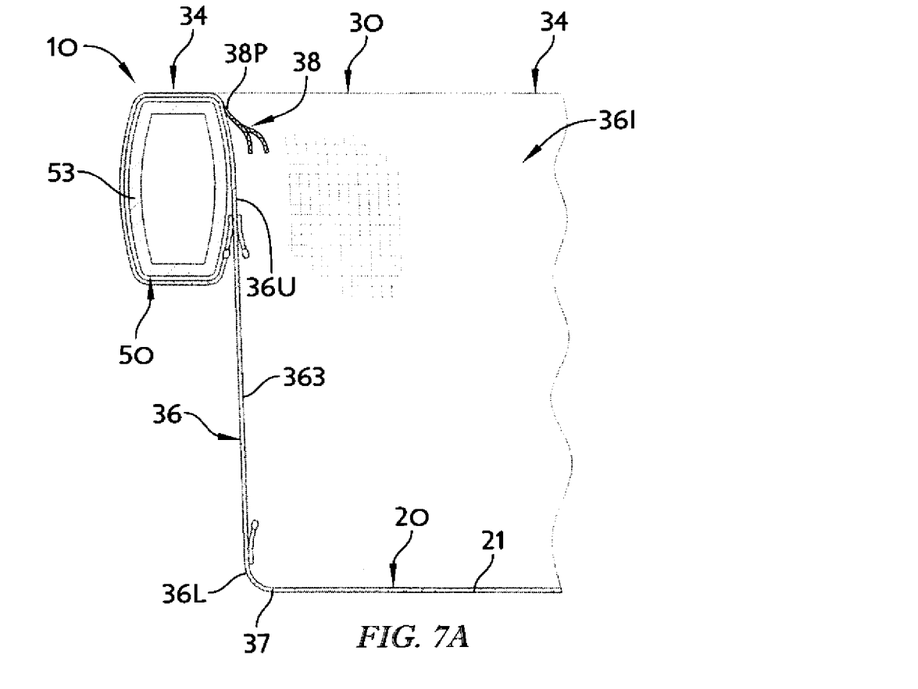
FIG. 7A is an enlarged sectional view taken along line 7A-7A of FIG. 5A showing that the inside foot-end zipper track is coupled to a lower portion of the side wall near the shape-changeable bottom panel and the companion outside foot-end zipper track is coupled to an inner edge of the zipper-track carrier web that is coupled to the top rim of the endless band.

In an illustrative embodiment, basket 16 includes a shape-changeable bottom panel 20 and a multi-piece side barrier 30 coupled to a perimeter edge 20P of shape-changeable bottom panel 20 using, for example, a stitching 37 as suggested in FIGS. 2 and 7A. Bottom panel 20 and side barrier 30 cooperate to form a space 36I for receiving a child therein as suggested in FIG. 1. The shape of shape-changeable bottom panel 20 can be changed from the substantially flat lowered position shown in bassinet mode 10B of child carrier 10 on the left side of FIG. 1 to the folded raised position shown in seat mode 10S of child carrier 10 on the right side of FIG. 1 at the option of a caregiver using a child carrier conversion process shown, for example in FIGS. 5 and 6.

Shape-changeable bottom panel 20 includes a foot end 21 comprising a seat-bottom section 21B and a leg-support section 21L and an opposite head end 22 as shown, for example, in FIGS. 1 and 2. Bottom panel 20 is formed to include several laterally extending fold lines 201-205 as suggested in FIG. 2 to facilitate a change in shape of bottom panel 20 during conversion of child carrier 10 by a caregiver between bassinet mode 10B and seat mode 10S as suggested in FIG. 1.

A bottom-panel shape changer 40 comprises zippers 41,42 or other suitable material connectors that are used to draw together and separate companion portions of side barrier 30 as suggested in FIGS. 5 and 6 to cause bottom panel 20 to move relative to basket-support frame 50 and change shape to convert child carrier 10 from bassinet mode 10B to seat mode 10S and vice versa.

Side barrier 30 includes an endless band 32 having a top rim 34 and a side wall 36 and also includes a zipper-track carrier web 38 as suggested in FIG. 2. Side wall 36 is arranged to extend around a perimeter edge 20P of shape-changeable bottom panel 20 as suggested in FIGS. 1 and 2. Zipper-track carrier web 38 is coupled to top rim 34 by means of a stitching 35 and is arranged to extend into an interior region 36I bounded by side wall 36 as suggested diagrammatically in FIG. 2 and illustratively in FIG. 5A. An outside zipper-track 41O of a foot-end zipper 41 is carried on an inner edge 38II of a foot-end portion 38I of web 38 and an outside zipper-track 42O of a head-end zipper 42 is carried on an inner edge 38I2 of a head-end portion 38I2 of web 38 as suggested in FIGS. 1 and 2.

As suggested in FIG. 2, perimeter edge 20P of shape-changeable bottom panel 20 is coupled to a lower edge 36L of side wall 36 by means of a stitching 37 (see FIGS. 2 and 7A) so the bottom panel 20 will move automatically toward and away from top rim 34 in response to movement of lower edge 36L of side wall 36 relative to top rim 34 (in response to operation of foot-end and head-end zippers 41, 42 by a caregiver) as suggested in FIGS. 5A-D, 6A-D, and 7A-B. Such up-and-down movement of shape-changeable bottom panel 20 causes bottom panel 20 to change shape from, for example, a substantially flat shape in the bassinet mode 10B of child carrier 10 as shown in the top left corner of FIG. 1 to a folded shape in the seat mode 10S of child carrier 10 as shown in the top right corner of FIG. 1 simply by moving sliding pieces 41SP, 42SP in zippers 41, 42 along their zipper tracks. It is within the scope of this disclosure to replace zippers 41,42 with other suitable material connectors such as snaps, hooks, or hook-and-loop fasteners.

Figure 5A:
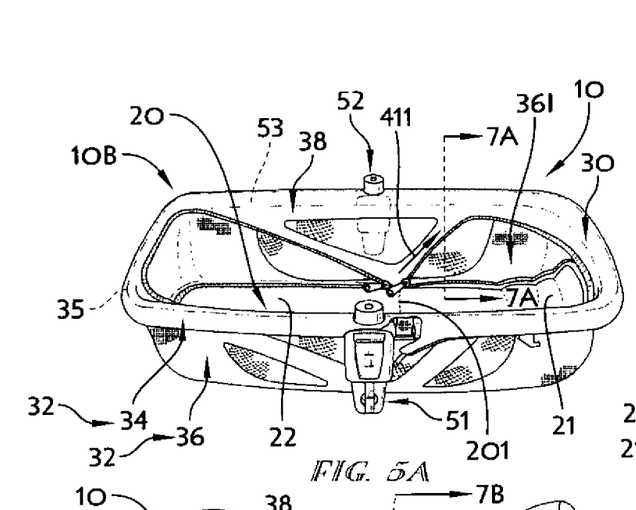
FIGS. 5A-5D show an illustrative sequence in which a caregiver operates an illustrative foot-end zipper by sliding a foot-end sliding piece along companion inside and outside foot-end zipper tracks mounted on a foot-end portion of the side barrier to reconfigure the foot-end portion of the side barrier and to raise automatically the foot-end portion of the bottom panel upwardly away from a substantially flat lowered position associated with the bassinet mode of the child carrier to assume a folded raised position associated with the seat mode of the child carrier.

A perimeter edge 38P of zipper-track carrier web 38 is coupled to rim 34 of endless band 32 by means of a stitching 35 as suggested in FIGS. 1 and 5A. Web 38 also includes a foot-end inner edge 38F that is arranged to extend around foot end 21 of bottom panel 20 and a head-end inner edge 38H that is arranged to extend around head end 22 of bottom panel 20 as suggested in FIGS. 1 and 2. Each of foot-end and head-end inner edges 38F, 38H of web 38 are substantially U-shaped in an illustrative embodiment as suggested in FIG. 2.

A foot-end section 36F of lower edge 36L of side wall 36 is arranged to extend around foot end 21 of bottom panel 20 as suggested in FIGS. 1 and 2. Similarly, a head-end section 36H of lower edge 36L of side wall 36 is arranged to extend around head end 22 of bottom panel 20 as also suggested in FIGS. 1 and 2. Each of foot-end and head-end sections 36F, 36H are substantially U-shaped in an illustrative embodiment.

Foot-end zipper 41 is coupled to and arranged to interconnect foot-end inner edge 38F of web 38 and foot-end section 36F of lower edge 36L of side wall 36 as suggested in FIG. 1. When foot-end zipper 41 is unzipped (as shown in FIG. 5A), side wall 36 is expanded and foot end 21 of bottom panel 20 is lowered and made substantially flat to place the foot end of child carrier 10 in bassinet mode 10B. When foot-end zipper 41 is zipped by a caregiver as suggested in FIGS. 5A-D, side wall 36 is collapsed as suggested in FIGS. 7A-7B, and foot end 21 of shape-changeable bottom panel 20 is raised and folded to place the foot end of child carrier 10 in seat mode 10S.

Head-end zipper 42 is coupled to and arranged to interconnect head-end inner edge 38H of web 38 and head-end section 36H of lower edge 36L of side wall 36 as suggested in FIG. 1. When head-end zipper 42 is unzipped a shown in FIG. 6A, side wall 36 is expanded and head end 22 of bottom panel 20 is lowered and made substantially flat to place the head end of child carrier 10 in bassinet mode 10B. When head-end zipper 42 is zipped by a caregiver as suggested in FIGS. 6A-6B, side wall 36 is collapsed and head end 22 of shape-changeable bottom panel 20 is inclined to place the head end of child carrier 10 in seat mode 10S.

A basket-support frame 50 is also included in child carrier 10 as shown, for example, in FIG. 2. In an illustrative embodiment, basket-support frame 50 includes a rim-support rail 53 coupled to top rim 34 of side barrier 30 and downwardly extending first and second rail-support posts 51, 52 coupled to rail 53 as shown in FIG. 2 and adapted to be coupled to rolling stroller frame 12 as suggested in FIG. 1. Basket-support frame 50 is arranged to lie above wheels 13 included in each of the bassinet and seat modes 12B, 12S of rolling stroller frame 12 as suggested in FIG. 1 to support basket 16 on the rolling stroller frame 12 whether child carrier 10 is in bassinet mode 10B or seat mode 10S as suggested in FIG. 1.

Side wall 36 of endless band 32 is an endless strip of fabric or other suitable pliable or deformable material as shown, for example, in FIG. 2. Side wall 36 comprises, in series, a near side panel 361, a foot-end panel 362, a far side panel 363, and a head-end panel 364. In illustrative embodiments, near side panel 361 is formed to include several side windows 36W1, 36W2, and 36W3 and a first screen 61 is coupled to an inner surface of near side panel 361 to cover those windows as suggested diagrammatically in FIG. 2 and illustratively in FIGS. 3, 4, and 5A. In illustrative embodiments, far side panel 363 is formed to include several more side windows 36W4, 36W5, and 36W6 and a second screen 63 is coupled to an inner surface of far side panel 363 to cover those windows as suggested diagrammatically in FIG. 2 and illustratively in FIGS. 3, 4, and 5A.

Top rim 34 of endless band 32 is an endless tubular piece formed to include a channel containing rim-support rail 53 of basket-support frame 50 as suggested in FIGS. 1, 3, 7A, and 7B. An upper edge 36U of side wall 36 is coupled to top rim 34 as shown, for example, in FIG. 7A. A perimeter portion 38P of zipper-track carrier web 38 is also coupled to top rim 34 of endless band 32 as suggested in FIGS. 2 and 7A.

Zipper-track carrier web 38 includes a perimeter ribbon 38R, a first fold-down sheet 38S1, and a second fold-down sheet 38S2 as shown, for example, in FIG. 2. First fold-down sheet 38S1 is formed to include a window 38W2 sized and shaped to match window 36W2 of near side panel 361 of side wall 36. First fold-down sheet 38S1 is coupled to perimeter ribbon 38R along first fold line F1 and an apex 38A1 of sheet 38S1 is configured to mate with a portion 36A1 of near side panel 361 as suggested in FIG. 2 to place windows 36W2, 38W2 in alignment as suggested in FIG. 1. Second fold-down sheet 38S2 is formed to include a window 38W5 sized and shaped to match window 36W2 of far side panel 363 of side wall 36. Second fold-down sheet 38S2 is coupled to an opposite side of perimeter ribbon 38R along second fold line F2 and an apex 38A2 of sheet 38S2 is configured to mate with a portion 36A2 of far side panel 362, as suggested in FIG. 2 to place windows 36W5, 38W5 in alignment as suggested in FIG. 1.

Foot-end zipper 41 of side barrier 30 includes an inside zipper track 41I, an outside zipper track 41O, and a foot-end sliding piece 41SP mating with inside and outside zipper tracks 41I, 41O as suggested in FIGS. 1 and 2. Foot-end sliding piece 41SP is configured to provide means for drawing together teeth included in each of zipper tracks 41I, 41O to cause a foot-end portion of side wall 36 to collapse and fold during establishment of child carrier seat mode 10S as suggested in FIGS. 4 and 7B or for separating teeth included in zipper tracks 41I, 41O to cause the foot-end portion of side wall 36 to expand during establishment of child carrier bassinet mode 10B as suggested in FIGS. 3 and 7A.

Head-end zipper 42 of side barrier 30 includes an inside zipper track 42I, an outside zipper rack 42O, and a head-end sliding piece 42SP mating with inside and outside zipper tracks 42I, 42O as suggested in FIGS. 1 and 2. Head-end sliding piece 42SP is configured to provide means for drawing together teeth included in each of zipper tracks 42I, 42O to cause a head-end portion of side wall 36 to collapse and fold during establishment of child carrier seat mode 10S as suggested in FIGS. 4 and 7B and for separating teeth included in zipper tracks 42I, 42O to cause the head-end portion of side wall 36 to expand during establishment of child carrier bassinet mode 10B as suggested in FIGS. 3 and 7A.

Child carrier 10 can be configured (as shown in the upper left part of FIG. 1) to function as a bassinet 10B that can be mounted in stroller frame 12 and, at the option of a caregiver, can be converted to function as a seat 10S (as shown in the upper right part of FIG. 1) that can be mounted in the same stroller frame 12 after the configuration of stroller frame 12 has been changed from bassinet mode 12B to seat mode 12S. Such conversion can take place after the caregiver (1) operates a foot-end zipper 41 to change the shape of a foot-end portion of side barrier 30 included in child carrier 10 and to cause an automatic change in the shape of foot-end portion 21 of bottom panel 20 coupled to side barrier 30 as shown, for example, in FIGS. 5A-5D and (2) operates a head-end zipper 42 to change the shape of a head-end portion of side barrier 30 to cause an automatic change in the shape of head-end portion 22 of bottom panel 20 as shown, for example, in FIGS. 6A-6D.

Shape-changeable bottom panel 20 includes a foot-end portion 21 that can be moved relative to side barrier 30 from a substantially flat lowered position associated with bassinet mode 10B of child carrier 10 to a folded raised position associated with seat mode 10S of the child carrier 10 as suggested in FIGS. 1 and 5. Shape-changeable bottom panel 30 also includes an opposing head-end portion 22 that can be moved relative to side barrier 30 and to foot-end portion of bottom panel 20 from a substantially flat lowered position associated with bassinet mode 10B of child carrier 10 to an inclined raised position associated with seat mode 10S of the child carrier 10 as suggested in FIGS. 1 and 6.

Figure 7B:
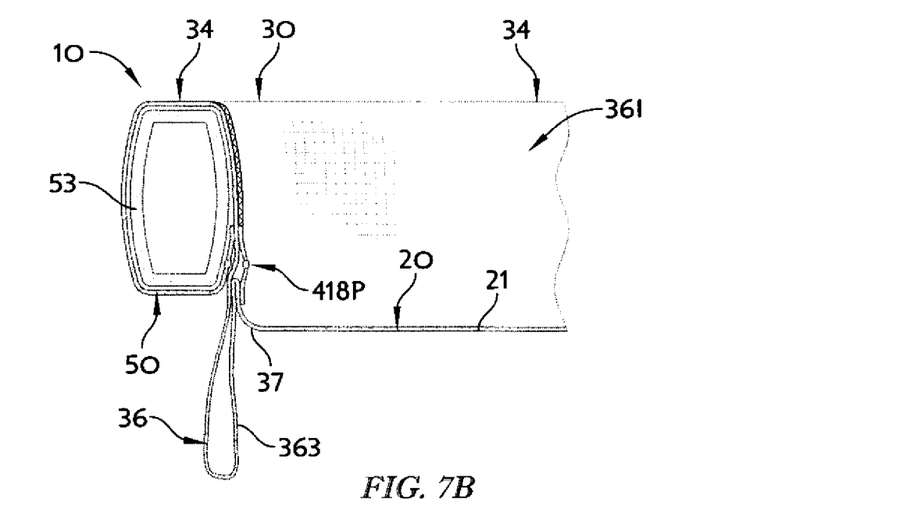
FIG. 7B is a sectional view similar to FIG. 7A taken along line 7B-7B of FIG. 5B showing that a portion of the side wall has been collapsed and folded as a result of sliding movement of the foot-end sliding piece as shown in FIGS. 5A-5D to draw the outside and inside foot-end zipper tracks together to cause automatic movement of an adjacent portion of the foot-end portion of the bottom panel from the substantially flat position shown in FIGS. 5A and 7A to the folded raised position also shown in FIG. 5B.

In illustrative embodiments, side wall 36 of side barrier 30 is generally expanded and taut when bottom panel 20 is placed in bassinet mode and is generally collapsed and folded when bottom panel 20 is placed in the seat mode as suggested in FIGS. 1, 7A, and 7B. Side barrier 30 is made of a pliable, foldable material in illustrative embodiments and therefore is deformed without damage each time the shape of shape-changeable bottom panel 20 is changed by a caregiver to establish either the bassinet mode 10B or the seat mode 10S of the child carrier 10.

Zipper-track carrier web 38 is coupled to top rim 34 and arranged to extend into an interior region 361 bounded by side wall 36 and toward shape-changeable bottom panel 20 as suggested in FIGS. 1 and 2. Web 38 includes a U-shaped foot-end inner edge 381I that is separated from side wall 36 and arranged to extend generally around foot-end portion 21 of shape-changeable bottom panel 20. Web 38 also includes a U-shaped head-end inner edge 382I that is separated from side wall 36 and arranged to extend generally around head-end portion 22 of shape-changeable bottom panel 20.

Child carrier 10 includes bottom panel shape-changer means 40 for reconfiguring the shape of side barrier 30 to change between an expanded shape (associated with bassinet mode 10B of the child carrier 10) and a collapsed shape (associated with seat mode 10S of the child carrier 10) at the option of the caregiver to cause a shape change of shape-changeable bottom panel 20 that is coupled to lower edge 36L of side wall 36 as suggested in FIGS. 1, 5, and 6. When child carrier 10 is in bassinet mode 10B, bottom panel 20 takes on a bassinet-mode shape in which foot-end and head-end portions 21, 22 of shape-changeable bottom panel 20 assume the substantially flat lowered positions when side barrier 30 is configured to assume the expanded shape. When child carrier 10 is in seat mode 10S, the bottom panel 20 takes on a seat-mode shape in which foot-end portion 21 assumes the folded raised shape and head-end portion 22 assumes the inclined raised shape when side barrier 30 is configured to assume the collapsed shape.

In illustrative embodiments, the bottom-panel shape-changer means 40 comprises a foot-end zipper 41 and a separate head-end zipper 42 as suggested in FIGS. 1, 2, 5, and 6. Foot-end zipper 41 is coupled to U-shaped foot-end inner edge 381I of web 38 and to a lower portion 36L of side wall 36 bordering foot-end portion 21 of shape-changeable bottom panel 20. Head-end zipper 42 is coupled to U-shaped head-end inner edge 381L of web 38 and to a lower portion of side wall 36 bordering head-end portion 22 of shape-changeable bottom panel 20.

Figure 5B:
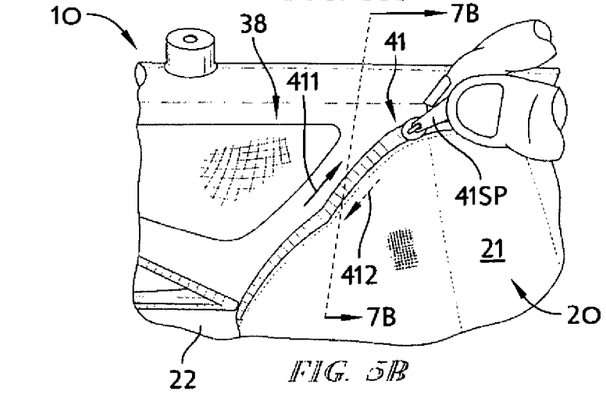
Figure 5C:
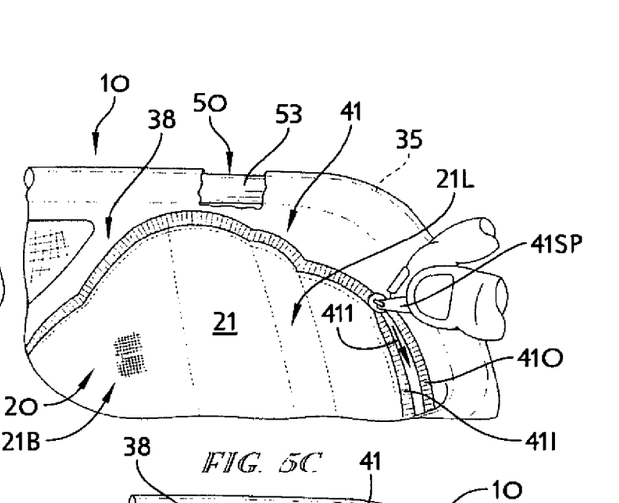
Figure 5D:
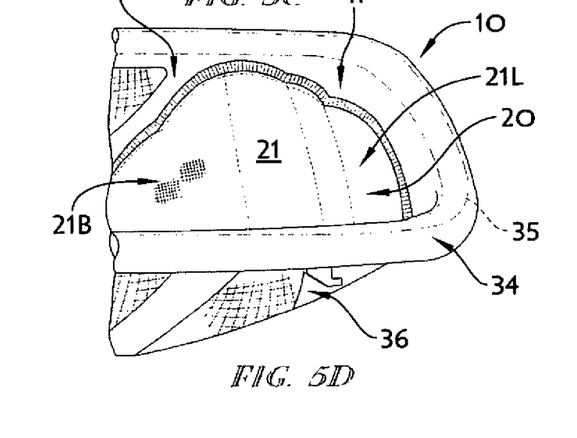

Foot-end zipper 41 includes a sliding piece 41SP that can be moved by a caregiver in one direction 41I as suggested in FIGS. 5A-C along an inner zipper track 41I coupled to lower portion 36L of side wall 36 bordering foot-end portion 21 of bottom panel 20 and a companion outer zipper track 41O coupled to U-shaped foot-end inner edge 381I of web 38 to configure a head-end portion of side barrier 30 to assume the collapsed shape to raise automatically foot-end portion 21 of bottom panel 20 upwardly from the substantially flat lowered position associated with bassinet mode 10B to the folded raised position associated with seat mode 10S. Foot-end zipper 41 can be moved by the caregiver along zipper tracks 41I, 41O in the opposite direction 412 to reconfigure a foot-end portion of side barrier 30 to assume the expanded shape to return automatically foot-end portion 21 of bottom panel 20 to the substantially flat lowered position associated with bassinet mode 10B.

FIGS. 5A-5D show an illustrative sequence in which a caregiver operates an illustrative foot-end zipper 41 by sliding a foot-end sliding piece 41SP along companion inside and outside foot-end zipper tracks 41I,41O mounted on a foot-end portion of side barrier 30. Such sliding movement reconfigures the foot-end portion of side barrier 30 and to raise automatically foot-end portion 21 of bottom panel 20 upwardly away from a substantially flat lowered position associated with bassinet mode 10B of the child carrier 10 to assume a folded raised position associated with seat mode 10S of the child carrier 10.

Head-end zipper 42 includes a sliding piece 42SP that can be moved by the caregiver in one direction 42I as suggested in FIGS. 6A-C along an inner zipper track 42I coupled to lower portion 36L of side wall 36 bordering head-end portion 22 of bottom panel 20 and a companion outer zipper track 42O coupled to U-shaped head-end edge 382I of web 38 to configure a head-end portion of side barrier 30 to assume the collapsed shape to raise automatically head-end portion 22 of the bottom panel 20 upwardly from the substantially flat lowered portion associated with bassinet mode 10B to the inclined raised position associated the seat mode 10S. Head-end zipper 42 can be moved by the caregiver along zipper tracks 42I, 42O in the opposite direction 422 to reconfigure a head-end portion of side barrier 30 to assume the expanded shape to return automatically head-end portion 22 of the bottom panel 20 to the substantially flat lowered position associated with bassinet mode 10B.

FIGS. 6A-6D show an illustrative sequence in which a caregiver operates an illustrative head-end zipper 42 by sliding head-end sliding piece 42SP along companion inside and outside head-end zipper tracks 42I,42O mounted on a head-end portion of side barrier 30. Such sliding movement reconfigures the head-end portion of side barrier 30 and to raise automatically head-end portion 22 of bottom panel 20 upwardly away from a substantially flat lowered position associated with bassinet mode 10B of the child carrier 10 to assume an inclined raised position associated with seat mode 10S of the child carrier 10.

As suggested in FIG. 7A, inside foot-end zipper track 41I is coupled to a lower portion 36L of side wall 36 near shape-changeable bottom panel 20 and the companion outside foot-end zipper track 42O is coupled to an inner edge 381I of web 38 that is coupled to top rim 34 of endless band 32. As suggested in FIG. 7B, a portion of side wall 36 has been collapsed and folded as a result of sliding movement of foot-end sliding piece 41SP as shown in FIGS. 5A-5D to draw outside and inside foot-end zipper tracks 41I, 41O together to cause automatic movement of an adjacent portion of foot-end portion 21 of bottom panel 20 from the substantially flat position shown in FIGS. 5A and 7A to the folded raised position also shown in FIG. 5B.

Figure 3:
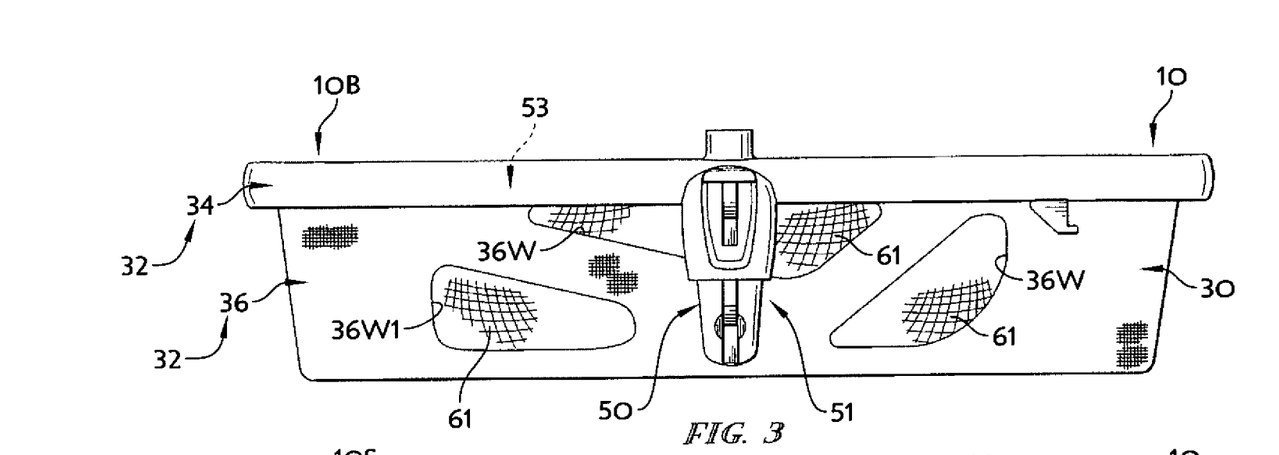
FIG. 3 is an enlarged side elevation view of a convertible child carrier in accordance with the present disclosure in the bassinet mode shown in FIG. 1.
Figures 8A, 8B:
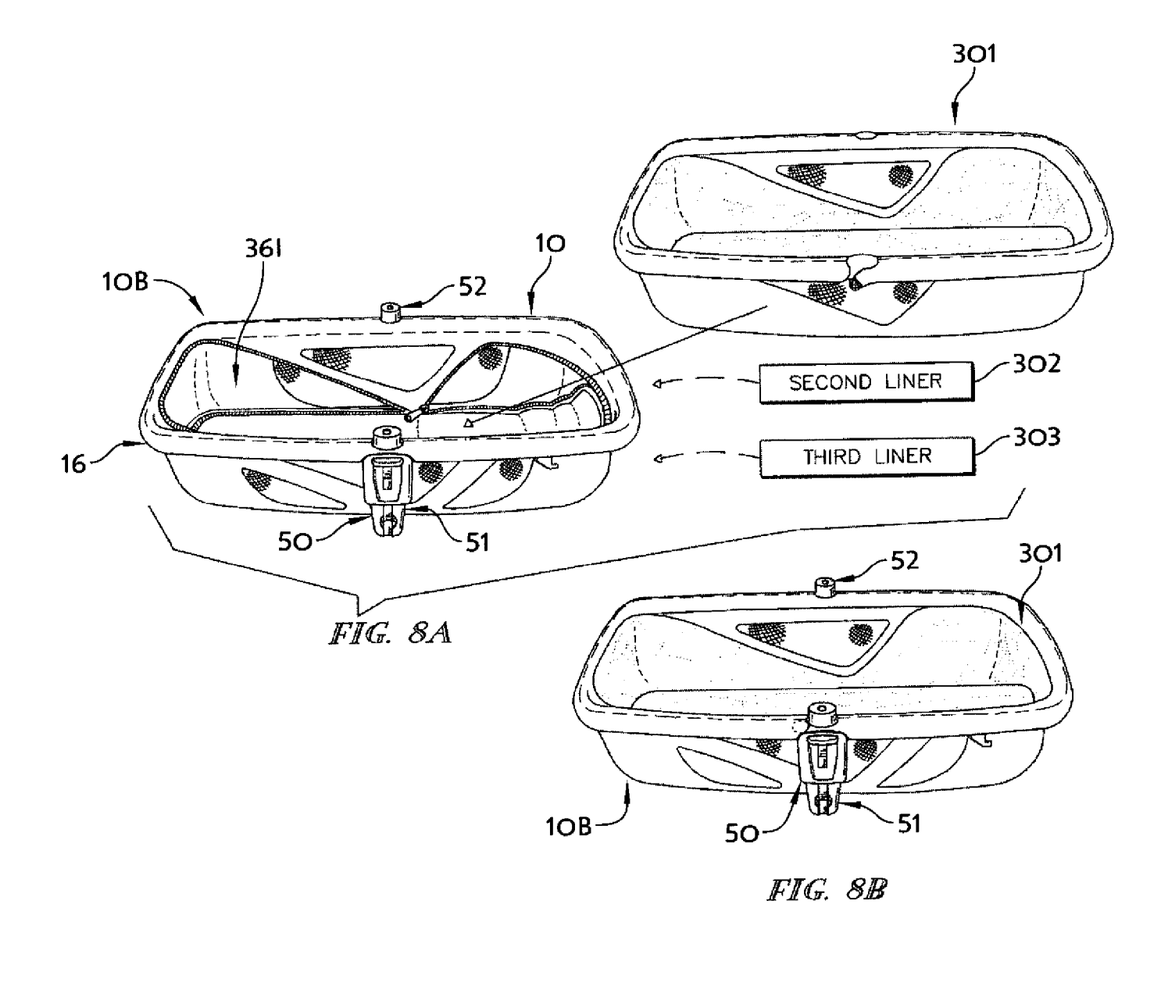
FIG. 8A is a diagrammatic view of three separate decorative bassinet-mode liners configured to mate temporarily (one at a time) with the bassinet-mode child carrier of FIGS. 1 and 3 in a nested position extending into the interior region of the bassinet-mode child carrier to line the bottom panel, interior side wall, and top rim of the child carrier while the child carrier is in bassinet mode to cover the foot-end and head-end edge zippers.
FIG. 8B is a perspective view showing mating engagement of the first decorative bassinet-mode liner of FIG. 8A and the child carrier of FIG. 8A to cover the foot-end and the head-end zippers.

As suggested in FIG. 8A, three separate decorative bassinet-mode liners 301, 302, and 303 configured to mate temporarily (one at a time) with bassinet-mode child carrier 10B of FIGS. 1 and 3 in a nested position extending into the interior region of the bassinet-mode child carrier 10B to line bottom panel 20, interior side wall 36, and top rim 34 of child carrier 10 while child carrier 10 is in bassinet mode 10B to cover foot-end and head-end zippers 41, 42. FIG. 8B is a perspective view showing mating engagement of the first decorative bassinet-mode liner 301 of FIG. 8A and child carrier 10 of FIG. 8A to cover foot-end and the head-end zippers 41, 42.

Figure 4:
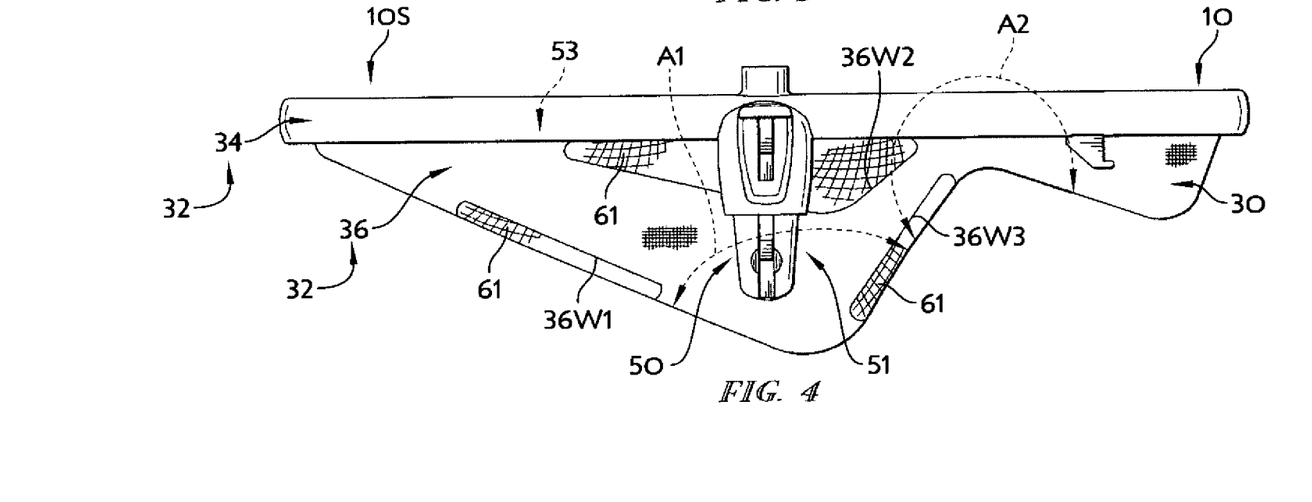
FIG. 4 is a side elevation view similar to FIG. 3 after the shape of the side barrier has been reconfigured from the expanded shape shown in FIG. 3 to the collapsed shape to change automatically the shape of the foot-end (right) and head-end (left) portions of the shape-changeable bottom panel to convert the child carrier from the bassinet mode of FIG. 3 to the seat mode of FIG. 4.
Figures 9A, 9B:
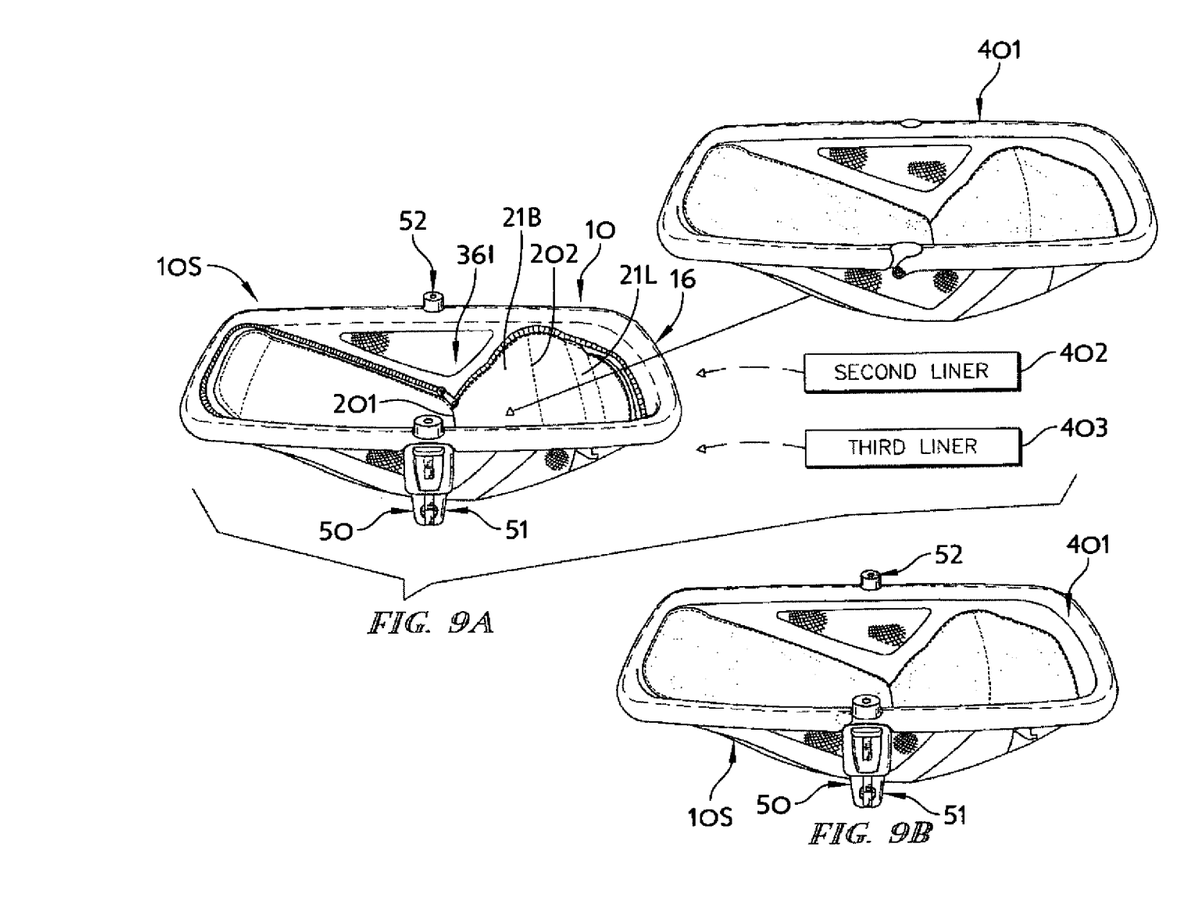
FIG. 9A is a diagrammatic view of three separate decorative seat-mode liners configured to mate temporarily (one at a time) with the seat-mode child carrier of FIGS. 1 and 4 in a nested position extending into the interior region of the seat-mode child carrier to line the raised segments of the bottom panel, interior side wall, and top rim of the child carrier while the child carrier is in seat mode to cover the foot-end and head-end zippers.
FIG. 9B is a perspective view showing mating engagement of the first decorative seat-mode liner of FIG. 9A and the child carrier of FIG. 9A to cover the foot-end and the head-end zippers.

As suggested in FIG. 9A, three separate decorative seat-mode liners configured to mate temporarily (one at a time) with the seat-mode child carrier 10S of FIGS. 1 and 4 in a nested position extending into the interior region of the seat-mode child carrier 10S to line the raised segments of bottom panel 20, interior side wall 36, and top rim 34 of child carrier 10 while child carrier 10 is in seat mode 10S to cover foot-end and head-end zippers 41, 42. FIG. 9B is a perspective view showing mating engagement of the first decorative seat-mode liner 40L of FIG. 9A and child carrier 10 of FIG. 9A to cover foot-end and the head-end zippers 41, 42.

A child transporter 11 includes a rolling stroller frame 12 and a convertible child carrier 10 coupled to rolling stroller frame 12 as shown, for example, in FIG. 1. Child carrier 10 includes a basket 16 and a basket-support frame 50 mounted on rolling stroller frame 12 and configured to support basket 16 in a horizontal orientation when child carrier 10 is in a bassinet mode 10B and in an inclined orientation relative to rolling stroller frame 12 when child carrier 10 is in seat mode 10S.

Basket 16 of convertible child carrier 10 includes a shape-changeable bottom panel 20, a side barrier 30, and a bottom-panel shape changer 40 as suggested in FIG. 2. Side barrier 30 includes a top rim 34 arranged to lie above shape-changeable bottom panel 20 and a side wall 36 made of a pliable material and coupled to each of top rim 34 and shape-changeable bottom panel 20 to form an interior child-receiving region 36I sized to receive a child to be transported. Bottom-panel shape changer 40 is configured to provide means for reconfiguring the shape of side wall 36 of side barrier 30 to cause the shape of shape-changeable bottom panel 20 to change from a substantially flat shape associated with a bassinet mode 10B of child carrier 10 and an expanded shape of side wall 36 to a folded shape associated with a seat mode 10S of child carrier 10 and a collapsed shape of side wall 36.

Shape-changeable bottom panel 20 includes a head-end portion 22 and a foot-end portion 21 as suggested in FIG. 2. Foot-end portion 21 includes a lower-leg section 21L and a seat-bottom section 21B arranged to interconnect head-end portion 22 and lower-leg section 21L. Head-end portion 22 and seat-bottom and lower-leg sections 21B, 21L of shape-changeable bottom panel 20 cooperate to define a substantially flat floor of basket 16 when side wall 36 is moved to assume the expanded shape as suggested in FIGS. 3, 5A, and 8A. Seat-bottom section 21B is arranged to lie at about right angles to each of head-end portion 22 and lower-leg section 21L to define a seat in which head-end portion 22 provides a backrest extending upwardly from a rear edge of seat-bottom section and lower-leg section 21L provides a leg rest extending downwardly from a front edge of seat-bottom section 21B when side wall 36 is moved to assume the collapsed shape as suggested in FIGS. 4 and 9A.

Side wall 36 includes a bottom edge coupled to a perimeter portion of the shape-changeable bottom panel 20 and a top edge coupled to tip rim 34 as suggested in FIGS. 1, 2, 7A, and 7B. Side barrier 30 further includes a web 38 coupled to top rim 34 and arranged to extend into the interior child-receiving region 36I. Web 38 includes a U-shaped foot-end inner edge that is separated from side wall 36 and arranged to extend generally around foot-end portion 21 of shape-changeable bottom panel 20 and a U-shaped head-end inner edge that is separated from side wall 36 and arranged to extend generally around head-end portion 22 of shape-changeable bottom panel 20.

Foot-end zipper 41 includes an inner zipper track 41I coupled to a lower portion of side wall 36 bordering foot-end portion 21 of shape-changeable bottom panel 20, a companion outer zipper track 41O coupled to U-shaped foot-end inner edge of web 38, and a foot-end sliding piece 41SP arranged to engage inner and outer zipper tracks 41I, 41O of foot-end zipper 41 as suggested in FIGS. 2, 5A, and 9A. Foot-end sliding piece 41SP is arranged to move in a first direction along inner and outer zipper tracks 41I, 41O of foot-end zipper 41 to cause a foot-end portion of side wall 36 to move relative to top rim 34 to assume the collapsed shape to raise automatically foot-end portion of shape-changeable bottom panel 20 upwardly from a substantially flat lowered position associated with bassinet mode 10B of child carrier 10 wherein seat-bottom and leg-support sections 21B, 21L lie in substantially coplanar relation to one another to form a portion of the substantially flat floor to assume a folded raised position associated with seat mode 10S of child carrier 10 wherein seat bottom and leg-support sections 21B, 21L lie at about right angles to one another. Foot-end sliding piece 41SP is also arranged to move in an opposite second direction along inner and outer zipper tracks 41I, 41O of foot-end zipper 41 to cause foot-end portion of side wall 36 to move relative to top rim 34 to assume the expanded shape to return automatically foot-end portion 21 of shape-changeable bottom panel 20 to the substantially flat lowered position associated with bassinet mode 10B of child carrier 10.

Head-end zipper 42 includes an inner zipper track 42I coupled to a lower portion of side wall 36 bordering head-end portion 22 of shape-changeable bottom panel 20, a companion outer zipper track 42O coupled to -shaped head-end inner edge of web 30, and a head-end sliding piece 42SP arranged to engage inner and outer zipper tracks 42I, 42O of head-end zipper 42 as suggested in FIGS. 2, 5A, and 9A. Head-end sliding piece 42SP is arranged to move in a first direction along inner and outer zipper tracks 42I, 42O of head-end zipper 42 to cause a head-end portion of side wall 36 of side barrier 30 to move relative to top rim 34 to assume the collapsed shape to raise automatically head-end portion 22 of the shape-changeable bottom panel 20 from a substantially flat lowered position associated with bassinet mode 10B of child carrier 10 to an inclined raised position associated with seat mode 10S of child carrier 10. Head-end sliding piece 42SP is also arranged to move in an opposite second direction along inner and outer zipper tracks 42I, 42o of head-end zipper 42 to cause head-end portion of side wall 36 of side barrier 30 to move relative to top rim 34 to assume the expanded shape to return automatically head-end portion 22 of shape-changeable bottom panel 20 to the substantially flat lowered position associated with bassinet mode 10B of child carrier 10.

Basket 16 including a shape-changeable bottom panel 20 having a substantially flat shape producing a bed in a bassinet mode 10B of convertible child carrier 10 and a folded shape producing a seat in a seat mode 10S of convertible child carrier 10 as suggested in FIG. 1. Basket 16 also includes a side barrier 30 including a top rim 34 arranged to lie above shape-changeable bottom panel 20 and a side wall 36 made of a pliable material and coupled to each of top rim 34 and shape-changeable bottom panel 20 to form an interior child-receiving region 361 sized to receive a child to be transported. Basket 16 further includes bottom-panel shape changer means 40 for drawing a lower portion of side wall 36 located near shape-changeable bottom panel 20 upwardly toward top rim 34 to change shape-changeable bottom panel 20 from the substantially flat shape to the folded shape to establish seat mode 10S of convertible child carrier 10 and for alternatively separating the lower portion of side wall 36 from top rim 34 to change shape-changeable bottom panel 20 from the folded shape to the substantially flat shape to establish bassinet mode 10B of convertible child carrier 10.

Shape-changeable bottom panel 20 includes a foot-end portion 21 coupled to a head-end portion 22 along a first fold line 201 as suggested in FIG. 2. Foot-end portion 21 includes a leg-support section 21L arranged to lie in spaced-apart relation to head-end portion 22 and a seat-bottom section 22B arranged to interconnect head-end portion 22 and leg-support section 21L and coupled to head-end portion 22 along first fold line 201 and to seat-bottom section 21B along a second fold line 202. Foot-end and head-end portions 21, 22 cooperate to lie in generally coplanar relation to one another to provide shape-changeable bottom panel 20 with the substantially flat shape in the bassinet mode 10B of convertible child carrier 10. In the seat mode 10S of convertible child carrier 10, upwardly facing surfaces of head-end portion 22 and seat-bottom section 21B of foot-end portion 21 bounding the interior child-receiving region 361 cooperate to define an obtuse included angle A1 therebetween as suggested in FIG. 4. Upwardly facing surfaces of the seat-bottom and leg-support sections 21B, 21L of foot-end portion 21 bounding interior child-receiving region 361 cooperate to define an included angle A2 therebetween that is greater than 180° as also suggested in FIG. 4.

Side barrier 30 further includes a zipper-track carrier web 38 arranged to extend away from the side wall 36 into the interior child-receiving region 361. Bottom-panel shape-changer means 40 includes a foot-end zipper 41 coupled to zipper-track carrier web 38 and to a lower foot-end portion of side wall 36 and a head-end zipper 42 coupled to zipper-track carrier web 38 and to a lower head-end portion of side wall 36.

A first end of each of foot-end and head-end zippers 41, 42 meet at a first junction along one part of first fold line 201 along a first side of shape-changeable bottom panel 20 as suggested in FIGS. 1, 5A, and 9!. An opposite second end of each of foot-end and head-end zippers 41, 42 meet at a second junction along another part of first fold line 201.

Foot-end zipper 41 is U-shaped and formed to include an interior space receiving seat-bottom and leg-support sections 21B, 21L therein as suggested in FIGS. 2 and 5A. Foot-end zipper 41 includes an elongated first-end strip comprising the first end and bordering a first side of seat-bottom section 21B, an elongated second-end strip comprising the second end and bordering a second side of seat-bottom section 21B, and a bight interconnecting the elongated first and second ends and bordering leg-support section 21L.

Side barrier 30 further includes a zipper-track carrier web 38 coupled to top rim 34 and arranged to extend away from side wall 36 as suggested in FIGS. 1, 2, 5A, and 7A. Bottom-panel shape-changer means 40 includes a foot-end zipper 41 including an inner foot-end zipper track 41I coupled to a lower foot-end portion of side wall 36 along a border between side wall 36 and a foot-end portion 21 of shape-changeable bottom panel 20, an outer foot-end zipper track 41O coupled to zipper-track carrier web 39, and a foot-end sliding piece 41SP. Foot-end sliding piece 41SP is configured to mate with inside and outside foot-end zipper tracks 41I, 41O. Foot-end sliding piece 41SP is configured to provide seat-mode conversion means for drawing together teeth included in the inside and outside foot-end zipper tracks 41I, 41O to draw lower foot-end portion of the side wall 36 upwardly toward top rim 34 in response to movement of foot-end sliding piece 41SP in a first direction on inside and outside foot-end zipper tracks 41I, 41O so that a foot-end portion 21 of shape-changeable bottom panel 20 is changed from the substantially flat shape to the folded shape during establishment of seat mode 10S of convertible child carrier 10. Foot-end sliding piece 41SP is also configured to provide bassinet-mode conversion means for separating teeth included in the inside and outside foot-end zipper tracks 41I, 41O to move lower foot-end portion of side wall 36 downwardly away from top rim 34 in response to movement of foot-end sliding piece 41SP in an opposite second direction on inside and outside foot-end zipper tracks 41I, 41O so that foot-end portion 21 of shape-changeable bottom panel 20 is changed from the folded shape to the substantially flat shape during establishment of bassinet mode 10B of convertible child carrier 10.

Bottom panel shape-changer means 40 further includes a head-end zipper 42 including an inner head-end zipper track 42I coupled to a lower head-end portion of side wall 36 along a border between side wall 36 and a head-end portion 22 of shape-changeable bottom panel 20, an outer head-end zipper track 42O coupled to zipper-track carrier web 38, and a head-end sliding piece 42SP. Head-end sliding piece 42SP is configured to mate with the inside and outside head-end zipper tracks 42I, 42O. Head-end sliding piece 42SP is configured to provide seat-mode conversion means for drawing together teeth included in the inside and outside head-end zipper tracks 42I, 42O to draw lower head-end portion of side wall 36 upwardly toward top rim 34 in response to movement of head-end sliding piece 42SP in a first direction on inside and outside head-end zipper tracks 42I, 42O so that a head-end portion 22 of shape-changeable bottom panel 20 is changed from substantially horizontal orientation to an inclined raised orientation during establishment of seat mode 10S of convertible child carrier 10. Head-end sliding piece 42SP is also configured to provide bassinet-mode conversion means for separating teeth included in the inside and outside head-end zipper tracks 42I, 42O to move lower head-end portion of side wall 36 downwardly away from top rim 34 in response to movement of head-end sliding piece 42SP in an opposite second direction on inside and outside head-end zipper tracks 42I, 42O so that head-end portion 22 of shape-changeable bottom panel 20 is changed from the inclined raised orientation to the substantially horizontal orientation during establishment of bassinet mode 10B of convertible child carrier 10.

Side wall 36 of side barrier 30 is maintained in a generally expanded and taut state in response to movement of shape-changeable bottom panel 20 relative to top rim 34 to assume the substantially flat shape as suggested in FIGS. 6A and 7A. Side wall 36 of side barrier 30 is maintained in a generally collapsed and folded state in response to movement of shape-changeable bottom panel 20 to assume the folded shape as suggested in FIGS. 6B and 7B.

The invention claimed is:

1. A child transporter comprising
a convertible child carrier comprising a basket including a shape-changeable bottom panel, a side barrier including a top rim arranged to lie above the shape-changeable bottom panel, a side wall made of a pliable material and coupled to each of the top rim and the shape-changeable bottom panel to form an interior child-receiving region sized to receive a child to be transported, a web coupled to the top rim and arranged to extend downwardly into the interior child-receiving region, and bottom-panel shape changer means located in the interior child-receiving region and coupled to the web and to a lower portion of the side wall alongside the shape-changeable bottom panel for reconfiguring the shape of the side wall of the side barrier to cause the shape of the shape-changeable bottom panel to change from a substantially flat shape associated with a bassinet mode of the child carrier and an expanded shape of the side wall to a folded shape associated with a seat mode of the child carrier and a collapsed shape of the side wall.

2. The child transporter of claim 1, wherein the shape-changeable bottom panel includes a head-end portion and a foot-end portion including a lower-leg section and a seat-bottom section arranged to interconnect the head-end portion and the lower-leg section, the head-end portion and the seat-bottom and lower-leg sections of the shape-changeable bottom panel cooperate to define a substantially flat floor of the basket when the side wall is moved to assume the expanded shape, and the seat-bottom section is arranged to lie at about right angles to each of the head-end portion and the lower-leg section to define a seat in which the head-end portion provides a backrest extending upwardly from a rear edge of the seat-bottom section and the lower-leg section provides a leg rest extending downwardly from a front edge of the seat-bottom section when the side wall is moved to assume the collapsed shape.

3. The child transporter of claim 2, wherein the side wall includes a bottom edge coupled to a perimeter portion of the shape-changeable bottom panel and a top edge coupled to the top rim, and the web includes a U-shaped foot-end inner edge that is separated from the side wall and arranged to extend generally around the foot-end portion of the shape-changeable bottom panel and a U-shaped head-end inner edge that is separated from the side wall and arranged to extend generally around the head-end portion of the shape-changeable bottom panel.

4. The child transporter of claim 3, wherein the bottom-panel shape changer means includes a foot-end zipper and the foot-end zipper includes an inner zipper track coupled to a lower portion of the side wall bordering the foot-end portion of the shape-changeable bottom panel, a companion outer zipper track coupled to the U-shaped foot-end inner edge of the web, and a foot-end sliding piece arranged to engage the inner and outer zipper tracks of the foot-end zipper and move in a first direction along the inner and outer zipper tracks of the foot-end zipper to cause a foot-end portion of the side wall to move relative to the top rim to assume the collapsed shape to raise automatically the foot-end portion of the shape-changeable bottom panel upwardly from a substantially flat lowered position associated with the bassinet mode of the child carrier wherein the seat-bottom and leg-support sections lie in substantially coplanar relation to one another to form a portion of the substantially flat floor to assume a folded raised position associated with the seat mode of the child carrier wherein the seat bottom and leg-support sections lie at about right angles to one another and to move in an opposite second direction along the inner and outer zipper tracks of the foot-end zipper to cause the foot-end portion of the side wall to move relative to the top rim to assume the expanded shape to return automatically the foot-end portion of the shape-changeable bottom panel to the substantially flat lowered position associated with the bassinet mode of the child carrier.

5. The child transporter of claim 3, wherein the bottom-panel shape changer means includes a head-end zipper and the head-end zipper includes an inner zipper track coupled to a lower portion of the side wall bordering the head-end portion of the shape-changeable bottom panel, a companion outer zipper track coupled to the U-shaped head-end inner edge of the web, and a head-end sliding piece arranged to engage the inner and outer zipper tracks of the head-end zipper and move in a first direction along the inner and outer zipper tracks of the head-end zipper to cause a head-end portion of the side wall of the side barrier to move relative to the top rim to assume the collapsed shape to raise automatically the head-end portion of the shape-changeable bottom panel from a substantially flat lowered position associated with the bassinet mode of the child carrier to an inclined raised position associated with the seat mode of the child carrier and to move in an opposite second direction along the inner and outer zipper tracks of the head-end zipper to cause the head-end portion of the side wall of the side barrier to move relative to the top rim to assume the expanded shape to return automatically the head-end portion of the shape-changeable bottom panel to the substantially flat lowered position associated with the bassinet mode of the child carrier.

6. The child transporter of claim 5, wherein the bottom-panel shape-changer means further includes a foot-end zipper and the foot-end zipper includes an inner zipper track coupled to a lower portion of the side wall bordering the foot-end portion of the shape-changeable bottom panel, a companion outer zipper track coupled to the U-shaped foot-end inner edge of the web, and a foot sliding piece arranged to engage the inner and outer zipper tracks of the foot-end zipper and move in a first direction along the inner and outer zipper tracks of the foot-end zipper to cause a foot-end portion of the side wall to move relative to the top rim to assume to collapsed shape to raise automatically the foot-end portion of the shape-changeable bottom panel upwardly from a substantially flat lowered position associated with the bassinet mode of the child carrier wherein the seat-bottom and leg-support sections lie in substantially coplanar relation to one another to form a portion of the substantially flat floor to assume a folded raised position associated with the seat mode of the child carrier wherein the seat bottom and leg-support sections lie at about right angles to one another and to move in an opposite second direction along the inner and outer zipper tracks of the foot-end zipper to cause the foot-end portion of the side wall to move relative to the top rim to assume the expanded shape to return automatically the foot-end portion of the shape-changeable bottom panel to the substantially flat lowered position associated with the bassinet mode of the child carrier.

7. The child transporter of claim 1, further comprising a rolling stroller frame and wherein the child carrier further comprises a basket-support frame mounted on the rolling stroller frame and configured to support the basket in a horizontal orientation relative to the rolling stroller frame when the child carrier is in the bassinet mode, and in an inclined orientation relative to the rolling stroller frame when the child carrier is in the seat mode.

8. The child transporter of claim 1, wherein the web is arranged to extend away from the side wall into the interior child-receiving region and the bottom-panel shape-changer means includes a foot-end zipper coupled to the web and to a lower foot-end portion of the side wall and a head-end zipper coupled to the web and to a lower head-end portion of the side wall.

9. The child transporter of claim 8, wherein a first end of each of the foot-end and head-end zippers meet at a first junction along one part of the first fold line along a first side of the shape-changeable bottom panel and an opposite second end of each of the foot-end and head-end zippers meet at a second junction along another part of the first fold line.

10. The child transporter of claim 9, wherein the foot-end zipper is U-shaped and formed to include an interior space receiving the seat-bottom and leg-support sections therein and the foot-end zipper includes an elongated first-end strip comprising the first end and bordering a first side of the seat-bottom section, an elongated second-end strip comprising the second end and bordering a second side of the seat-bottom section, and a bight interconnecting the elongated first and second ends and bordering the leg-support section.

11. The child transporter of claim 8, wherein the web includes an outer edge coupled to the top rim and an inner edge coupled to the foot-end and head-end zippers.

12. The child transporter of claim 8, wherein the web includes a perimeter ribbon coupled to the top rim, a first fold-down sheet, and a second fold-down sheet, the first fold-down sheet is coupled to the perimeter ribbon along a first fold line and arranged to lie in the interior child-receiving region alongside the side wall and to extend downwardly toward the shape-changeable bottom panel to position an apex of the first fold-down sheet along the first fold line of the shape-changeable bottom panel, and a second fold-down sheet is coupled to the perimeter ribbon along a second fold line and arranged to lie in the interior child-receiving region alongside the side wall and to extend downwardly toward the shape-changeable bottom panel to position an apex of the second fold-down sheet along the first fold line of the shape-chargeable bottom panel, the foot-end zipper is coupled to foot-end segments of each of the first fold-down sheet, perimeter ribbon, and second fold-down sheet, and the head-end zipper is coupled to head-end segments of each of the first fold-down sheet, perimeter ribbon, and second fold-down sheet.

13. The child transporter of claim 8, wherein the side wall of the side barrier is maintained in a generally expanded and taut state in response to movement of the shape-changeable bottom panel relative to the top rim to assume the substantially flat shape and the side wall of the side barrier is maintained in a generally collapsed and folded state in response to movement of the shape-changeable bottom panel to assume the folded shape.

14. The child transporter of claim 1, wherein the web includes a U-shaped foot-end inner edge that is separated from the side wall and arranged to extend generally around the foot-end portion of the shape-changeable bottom panel and a U-shaped head-end inner edge that is separated from the side wall and arranged to extend generally around the head-end portion of the shape-changeable bottom panel, the bottom-panel shape-changer means includes a foot-end zipper and a head-end zipper, the foot-end zipper is coupled to the U-shaped foot-end inner edge of the web and to a lower portion of the side wall bordering the foot-end portion of the shape-changeable bottom panel, and the head-end zipper is coupled to the U-shaped head-end inner edge of the web and to a lower portion of the side wall bordering the head-end portion of the shape-changeable bottom panel.

15. The child transporter of claim 14, wherein the foot-end zipper includes a sliding piece that is arranged to be moved by a caregiver in one direction along an inner zipper track coupled to the lower portion of the side wall bordering the foot-end portion of the bottom panel and a companion outer zipper track coupled to the U-shaped foot-end inner edge of the web to configure a foot-end portion of the side wall of the side barrier to assume the collapsed shape to raise automatically the foot-end portion of the bottom panel upwardly from the substantially flat lowered position associated with the bassinet mode to the folded raised position associated with the seat mode and the foot-end zipper is arranged to be moved by the caregiver in the opposite direction to reconfigure a foot-end portion of the side barrier to assume the expanded shape to return automatically the foot-end portion of the bottom panel to the substantially flat lowered position associated with the bassinet mode.

16. The child transporter of claim 14, wherein the head-end zipper includes a sliding piece that is arranged to be moved by the caregiver in one direction along an inner zipper track coupled to the lower portion of the side wall bordering the head-end portion of the bottom panel and a companion outer zipper track coupled to the U-shaped head-end edge of the web to configure a head-end portion of the side wall of the side barrier to assume the collapsed shape to raise automatically the head-end portion of the bottom panel upwardly from the substantially flat lowered position associated with the bassinet mode to the inclined raised position associated with the seat mode and the head-end zipper is arranged to be moved by the caregiver along the zipper tracks in the opposite direction to reconfigure a head-end portion of the side barrier to assume the expanded shape to return automatically the head-end portion of the bottom panel to the substantially flat lowered position associated with the bassinet model.

17. A child transporter comprising
a convertible child carrier comprising a basket including a shape-changeable bottom panel having a substantially flat shape producing a bed in a bassinet mode of the convertible child carrier and a folded shape producing a seat in a seat mode of the convertible child carrier, a side barrier including a top rim arranged to lie above the shape-changeable bottom panel, a side wall made of a pliable material and coupled to each of the top rim and the shape-changeable bottom panel to form an interior child-receiving region sized to receive a child to be transported, a web coupled to the top rim and arranged to extend downwardly into the interior child-receiving region, and bottom-panel shape changer means located in the interior child-receiving region and coupled to the web and to a lower section of the side wall alongside the shape-changeable bottom panel for drawing a lower portion of the side wall located near the shape-changeable bottom panel upwardly toward the top rim to change the shape-changeable bottom panel from the substantially flat shape to the folded shape to establish the seat mode of the convertible child carrier and for alternatively separating the lower portion of the side wall from the top rim to change the shape-changeable bottom panel from the folded shape to the substantially flat shape to establish the bassinet mode of the convertible child carrier.

18. The child transporter of claim 17, wherein the shape-changeable bottom panel includes a foot-end portion coupled to a head-end portion along a first fold line and the foot-end portion includes a leg-support section arranged to lie in spaced-apart relation to the head-end portion and a seat-bottom section arranged to interconnect the head-end portion and the leg-support section and coupled to the head-end portion along the first fold line and to the seat-bottom section along a second fold line, the foot-end and head-end portions cooperate to lie in generally coplanar relation to one another to provide the shape-changeable bottom panel with the substantially flat shape in the bassinet mode of the convertible child carrier, and, in the seat mode of the convertible child carrier, upwardly facing surfaces of the head-end portion and the seat-bottom section of the foot-end portion bounding the interior child-receiving region cooperate to define an obtuse included angle therebetween and upwardly facing surfaces of the seat-bottom and leg-support sections of the foot-end portion bounding the interior child-receiving region cooperate to define an included angle therebetween that is greater than 180°.

19. The child transporter of claim 18, wherein the web is arranged to extend away from the side wall into the interior child-receiving region and the bottom-panel shape-changer means includes a foot-end zipper coupled to the web and to a lower foot-end portion of the side wall and a head-end zipper coupled to the web and to a lower head-end portion of the side wall.

20. The child transporter of claim 19, wherein a first end of each of the foot-end and head-end zippers meet at a first junction along one part of the first fold line along a first side of the shape-changeable bottom panel and an opposite second end of each of the foot-end and head-end zippers meet at a second junction along another part of the first fold line.

21. The child transporter of claim 20, wherein the foot-end zipper is U-shaped and formed to include an interior space receiving the seat-bottom and leg-support sections therein and the foot-end zipper includes an elongated first-end strip comprising the first end and bordering a first side of the seat-bottom section, an elongated second-end strip comprising the second end and bordering a second side of the seat-bottom section, and a bight interconnecting the elongated first and second ends and bordering the leg-support section.

22. The child transporter of claim 19, wherein the web includes an outer edge coupled to the top rim and an inner edge coupled to the foot-end and head-end zippers.

23. The child transporter of claim 19, wherein the web includes a perimeter ribbon coupled to the top rim, a first fold-down sheet, and a second fold-down sheet, the first fold-down sheet is coupled to the perimeter ribbon along a first fold line and arranged to lie in the interior child-receiving region alongside the side wall and to extend downwardly toward the shape-changeable bottom panel to position an apex of the first fold-down sheet along the first fold line of the shape-changeable bottom panel, and a second fold-down sheet is coupled to the perimeter ribbon along a second fold line and arranged to lie in the interior child-receiving region alongside the side wall and to extend downwardly toward the shape-changeable bottom panel to position an apex of the second fold-down sheet along the first fold line of the shape-chargeable bottom panel, the foot-end zipper is coupled to foot-end segments of each of the first fold-down sheet, perimeter ribbon, and second fold-down sheet, and the head-end zipper is coupled to head-end segments of each of the first fold-down sheet, perimeter ribbon, and second fold-down sheet.

24. The child transporter of claim 17, further comprising a rolling stroller frame and wherein the child carrier further comprises a basket-support frame mounted on the rolling stroller frame and configured to support the basket in a horizontal orientation relative to the rolling stroller frame when the child carrier is in the bassinet mode, and in an inclined orientation relative to the rolling stroller frame when the child carrier is in the seat mode.

25. The child transporter of claim 17, wherein the bottom-panel shape-changer means includes a foot-end zipper including an inside foot-end zipper track coupled to a lower foot-end portion of the side wall along a border between the side wall and a foot-end portion of the shape-changeable bottom panel, an outside foot-end zipper track coupled to the web, and a foot-end sliding piece configured to mate with the inside and outside foot-end zipper tracks and configured to provide seat-mode conversion means for drawing together teeth included in the inside and outside foot-end zipper tracks to draw the lower foot-end portion of the side wall upwardly toward the top rim in response to movement of the foot-end sliding piece in a first direction on the inside and outside foot-end zipper tracks so that a foot-end portion of the shape-changeable bottom panel is changed from the substantially flat shape to the folded shape during establishment of the seat mode of the convertible child carrier and bassinet-mode conversion means for separating teeth included in the inside and outside foot-end zipper tracks to move the lower foot-end portion of the side wall downwardly away from the top rim in response to movement of the foot-end sliding piece in an opposite second direction on the inside and outside foot-end zipper tracks so that the foot-end portion of the shape-changeable bottom panel is changed from the folded shape to the substantially flat shape during establishment of the bassinet mode of the convertible child carrier.

26. The child transporter of claim 25, wherein the bottom-panel shape-changer means further includes a head-end zipper including an inside head-end zipper track coupled to a lower head-end portion of the side wall along a border between the side wall and a head-end portion of the shape-changeable bottom panel, an outside head-end zipper track coupled to the web, and a head-end sliding piece configured to mate with the inside and outside head-end zipper tracks and configured to provide seat-mode conversion means for drawing together teeth included in the inside and outside head-end zipper tracks to draw the lower head-end portion of the side wall upwardly toward the top rim in response to movement of the head-end sliding piece in a first direction on the inside and outside head-end zipper tracks so that a head-end portion of the shape-changeable bottom panel is changed from substantially horizontal orientation to an inclined raised orientation during establishment of the seat mode of the convertible child carrier and bassinet-mode conversion means for separating teeth included in the inside and outside head-end zipper tracks to move the lower head-end portion of the side wall downwardly away from the top rim in response to movement of the head-end sliding piece in an opposite second direction on the inside and outside head-end zipper tracks so that the head-end portion of the shape-changeable bottom panel is changed from the inclined raised orientation to the substantially horizontal orientation during establishment of the bassinet mode of the convertible child carrier.

27. The child transporter of claim 17, wherein the side wall of the side barrier is maintained in a generally expanded and taut state in response to movement of the shape-changeable bottom panel relative to the top rim to assume the substantially flat shape and the side wall of the side barrier is maintained in a generally collapsed and folded state in response to movement of the shape-changeable bottom panel to assume the folded shape.

* * * * *